United States Patent

Satoh et al.

[11] Patent Number: 5,529,280
[45] Date of Patent: Jun. 25, 1996

[54] DIAPHRAGM VALVE

[75] Inventors: Kazuo Satoh, Yokohama; Koichi Yoshihara, Fujisawa, both of Japan

[73] Assignee: NOK Corporation, Tokyo, Japan

[21] Appl. No.: 534,157

[22] Filed: Sep. 26, 1995

[30] Foreign Application Priority Data

Sep. 26, 1994 [JP] Japan .................................. 6-254170
Nov. 28, 1994 [JP] Japan .................................. 6-316040

[51] Int. Cl.⁶ ................................................. F16K 31/126
[52] U.S. Cl. ............................................ 251/61.1; 251/331
[58] Field of Search .................................. 251/61.1, 331, 251/356, 366

[56] References Cited

U.S. PATENT DOCUMENTS 4,044,743  8/1977  Eaton .................................. 251/61.1 X
4,181,151  1/1980  Ensign ................................ 251/61.1 X
4,715,578  12/1987 Seltzer ................................ 251/61.1 X

FOREIGN PATENT DOCUMENTS 53-35393  3/1978  Japan .
62-41968  3/1987  Japan .
1-105713  7/1989  Japan .

*Primary Examiner*—Kevin Lee
*Attorney, Agent, or Firm*—Jacobson, Price, Holman & Stern

[57]  ABSTRACT

A diaphragm valve (20) of the class having a diaphragm (32) backed-up by a spring retainer (38). The spring retainer (38) is provided, at a portion thereof facing the valve seat (30), with a relieved surface (48) spaced away from the diaphragm (38) in the free state thereof. The relieved surface (48) permits the diaphragm to resiliently yield in response to any circumferential undulation or unevenness (52) of the valve seat to provide a snug fit between the diaphragm (32) and the valve seat (30) throughout the entire circumference of the valve seat.

5 Claims, 6 Drawing Sheets

5,529,280

1

DIAPHRAGM VALVE

BACKGROUND OF THE INVENTION

1. Field of the Invention

The present invention relates broadly to a diaphragm valve wherein a flexible diaphragm cooperates with an associated valve seat to control a flow of a fluid. More specifically, this invention is directed to improvements in a diaphragm valve of the class wherein a flexible diaphragm is backed-up by a rigid spring retainer biased by a coiled spring.

2. Description of the Prior Art

Diaphragm valves are known, for example, from Japanese Utility Model Kokai Publication Nos. 53-35393 and 1-105713. Although some type of the conventional diaphragm valves, such as the ones shown in Japanese Utility Model Kokai Publication No. 62-41968, are designed such that a biasing force required to urge the diaphragm against an associated valve seat is developed by buckling of an intermediate portion of an elastomeric diaphragm, it has been the general practice in the art to use a coiled spring so as to bring the diaphragm in a sealing contact with the valve seat. The use of a separate coiled spring is preferable, since the diaphragm can be made more flexible. An example of such diaphragm valves having coiled springs is shown in FIG. 1.

In the diaphragm valve shown in FIG. 1, a fluid flow between an inlet 1 and an outlet 2 is controlled by a flexible diaphragm 3 which opens and closes a valve seat 4. The diaphragm is made of an elastomeric material and is backed-up by a spring retainer 5 of a rigid material such as metal or rigid plastics. A coiled spring 6 acting upon the spring retainer is arranged in a sensing chamber 7 defined by the diaphragm and a cap 8. The provision for the spring retainer is essential for an even distribution of the spring force on the diaphragm. As shown enlarged in FIG. 2, the diaphragm is integrally formed with an annular bead 9 serving as a compressible sealing portion of the diaphragm.

As is well-known, when the pressure in the sensing chamber is equal to an inlet pressure, the coiled spring biases the spring retainer which, in turn, urges the sealing bead 9 in contact with the valve seat so that the valve is closed. When the pressure differential developed across the diaphragm overcomes the spring force, the diaphragm is lifted away from the valve seat to permit the fluid flow.

Typically, the components parts of the diaphragm valve are manufactured by a mass production process. Unless subjected to precision machining, the plane of the valve seat as manufactured may suffer from a certain degree of unevenness or lack of flatness so that a circumferential undulation 10 may be present in the plane of the valve seat as shown in FIG. 3. Formation of undulation is particularly noticeable when the valve body 11 is manufactured by molding of a plastic material, since the moldings undergo an uneven shrinkage during a cooling process. Similarly, the lack of flatness may also be present in the spring retainer.

In order to establish a good sealing contact between the diaphragm and the valve seat in the closed position of the valve despite the presence of the foregoing undulation, it is desirable that the force of the coiled spring be strong enough to flatten and compress the sealing bead 9 against the valve seat 4 throughout the entire circumferential contour of the valve seat.

However, in certain applications, such as the diaphragm valve for use in controlling a flow of fuel vapor in an automotive onboard refueling vapor recovery (ORVR) system, it is desirable to design the valve in such a manner as to open and close in response to a small pressure differential. In such applications, a coiled spring must be used which only has a limited spring force.

With such a limited spring force, it is difficult for the coiled spring to tightly compress the sealing bead 9 against the valve seat throughout the entire circumference of the valve seat. As a result, the undulated valve seat or spring retainer would lead to a formation of a gap 12 left between the diaphragm and the valve seat, as shown in FIG. 3. This gives rise to a fluid leakage in the closed position of the valve.

Accordingly, it is the primary object of the present invention to provide an improved diaphragm valve of the class mentioned, which is able to completely shut-off the fluid flow in the closed position of the valve despite the presence of any undulation or lack of flatness of the valve seat and/or the spring retainer.

Another object of the invention is to provide an improved diaphragm valve which is operable in response to a small pressure differential and which is yet operable to shut-off the fluid flow with a high degree of sealability in the closed position of the valve.

As the diaphragm is subjected for a long period of time to an atmosphere containing a fuel vapor, the elastomeric material forming the diaphragm is swelled by the fuel vapor. This causes the diaphragm to expand so that the annular bead 9, which originally was in registration with the valve seat as shown in FIG. 4A, becomes offset radially outwardly away from the associated valve seat as shown in FIG. 4B. This also brings about an inadvertent fluid leakage.

Accordingly, a still another object of the invention is to provide an improved diaphragm valve which is capable of preventing the fluid leakage for a long period notwithstanding the occurrence of the swelling of the diaphragm.

In another form of the conventional diaphragm valves, such as the ones shown in FIG. 5A, an annular sealing bead 13 is formed on the valve seat. The foregoing problem of undulation is also encountered in these valves. In addition, while the valve is closed under the spring action, the annular bead 13 bites into the diaphragm so that a persistent deformation 14 may be formed on the diaphragm. When the diaphragm swells or the spring retainer is offset as shown in FIG. 5B, the sealing engagement between the valve seat and the diaphragm becomes unstable or insufficient so that there is a risk of fluid leakage.

Accordingly, a further object of the invention is to provide an improved diaphragm valve which is exempt from formation of a persistent deformation.

SUMMARY OF THE INVENTION

This invention provides a diaphragm valve of the class having a diaphragm backed-up by a spring retainer. The primary feature of the invention is that the spring retainer is provided, at a portion thereof facing the valve seat, with a relieved surface spaced away from the diaphragm in the free state thereof.

The relieved surface provides a clearance or gap above the diaphragm in its free state. In the closed position of the valve, this clearance or gap permits the portion of the diaphragm facing the valve seat to resiliently yield in response to a circumferential undulation or unevenness of the valve seat. Accordingly, whenever the valve is closed, there is a snug fit between the diaphragm and the valve seat throughout the entire circumference of the valve seat to establish a high degree of sealability.

In a preferred embodiment of the invention, the diaphragm valve is provided with a sensing chamber defined by the diaphragm. The coiled spring biasing the diaphragm is designed to develop such a limited spring force that the valve is open in response to a pressure drop of less than about 100 mmAq (millimeter water column), preferably less than about 50 mmAq. This embodiment is particularly suitable for use in an automotive onboard refueling vapor recovery (ORVR) system wherein the flow of fuel vapor must be controlled in response to a slight change in pressure differential.

In another embodiment, an annular bead is formed on the valve seat and the relieved surface of the spring retainer is formed by an annular groove facing the annular bead of the valve seat. With this arrangement, a good sealing engagement is provided between the diaphragm and the annular bead even in the event that the diaphragm undergoes swelling. Furthermore, the sealing pressure per unit circumferential length of the sealing portion of the diaphragm is reduced so that formation of a persistent deformation of the diaphragm is advantageously avoided.

These features and advantages of the invention as well as other features and advantages thereof will become apparent from the following description.

DESCRIPTION OF THE PREFERRED EMBODIMENTS

Figure 1:
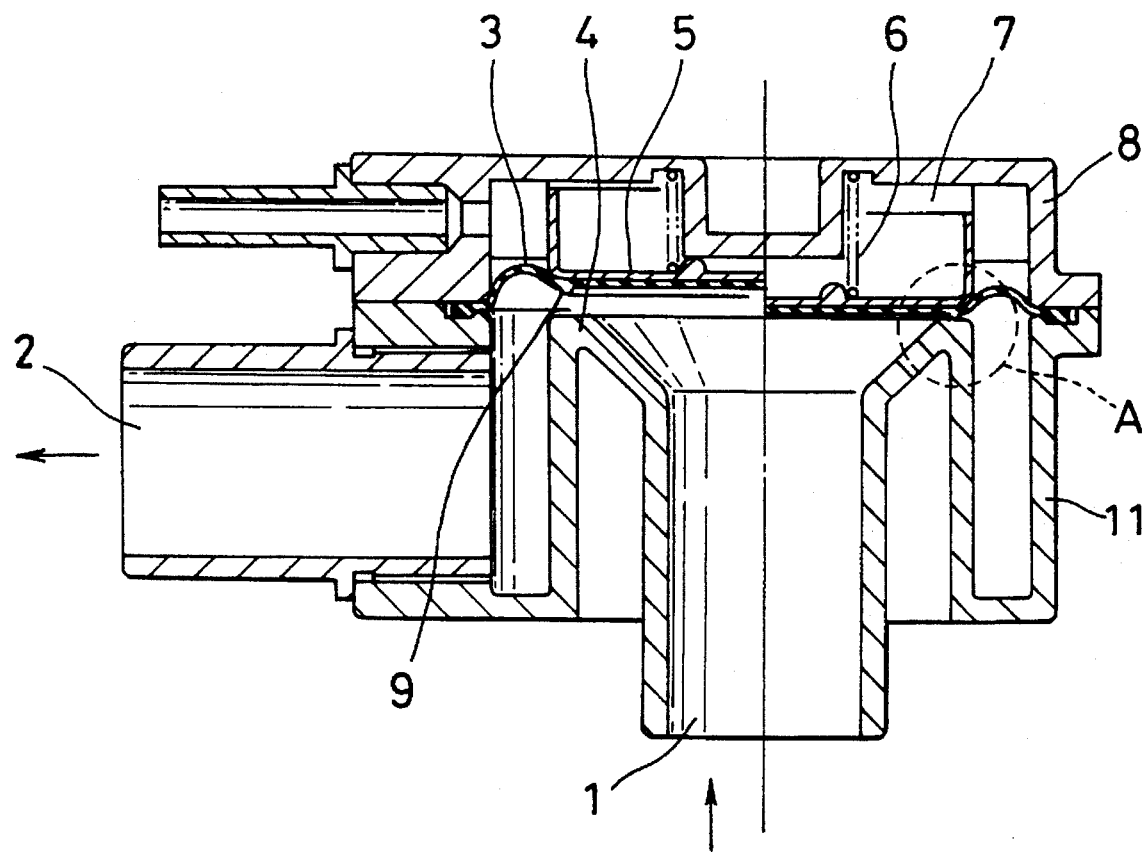
FIG. 1 is a cross-sectional view of the conventional diaphragm valve, with the left-hand and right-hand halves with respect to the centerline showing the valve in its open and closed positions, respectively.
Figure 2:
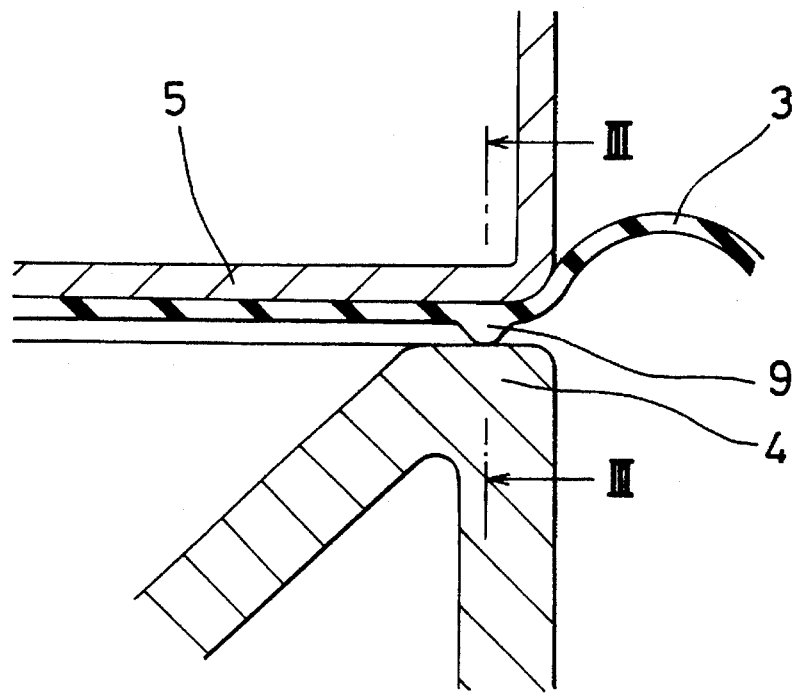
FIG. 2 is an enlarged cross-sectional view of a portion encircled by the circle A in FIG. 1.
Figure 3:
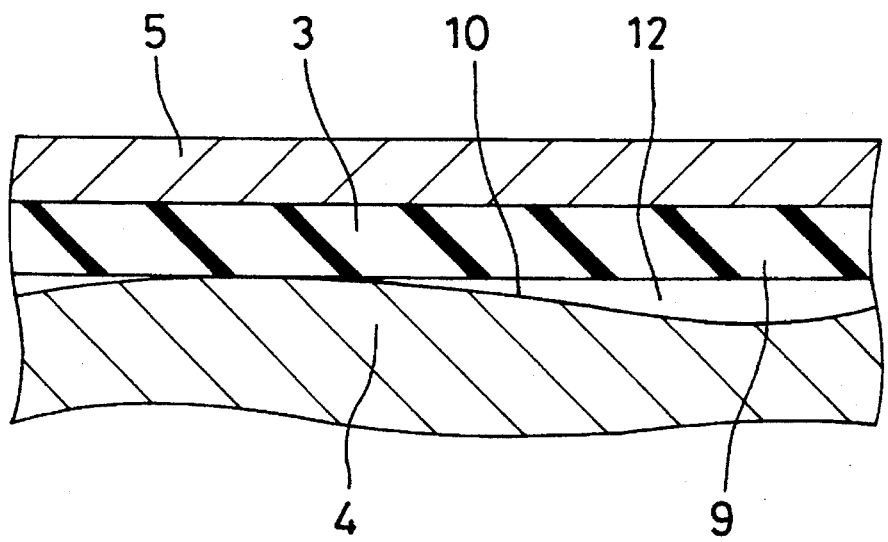
FIG. 3 is an enlarged cross-sectional view taken through a certain angle along a cylindrical plane indicated by the arrows III—III in FIG. 2.
Figure 4A:
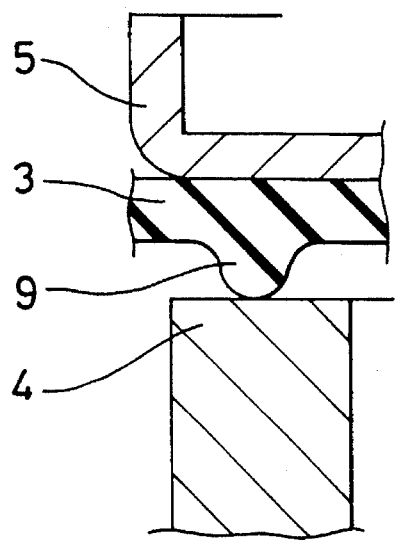
FIGS. 4A and 4B are cross-sectional views, similar to FIG. 2, of a part of another conventional diaphragm valve, showing the diaphragm prior to and subsequent to swelling, respectively.
Figure 4B:
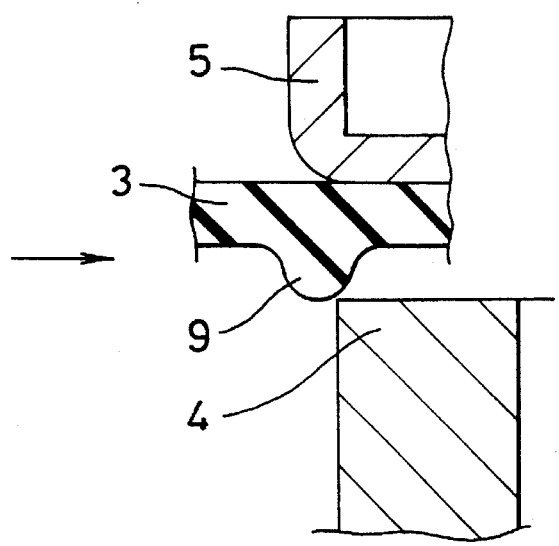
Figure 5A:
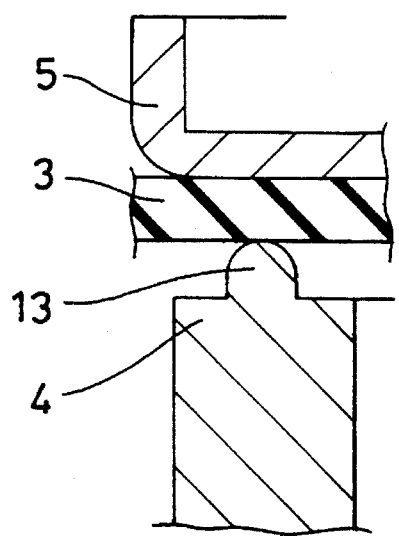
FIGS. 5A and 5B are cross-sectional views of a part of a still another conventional diaphragm valve and illustrating, respectively, the diaphragm prior to and subsequent to the formation of a persistent deformation.
Figure 5B:
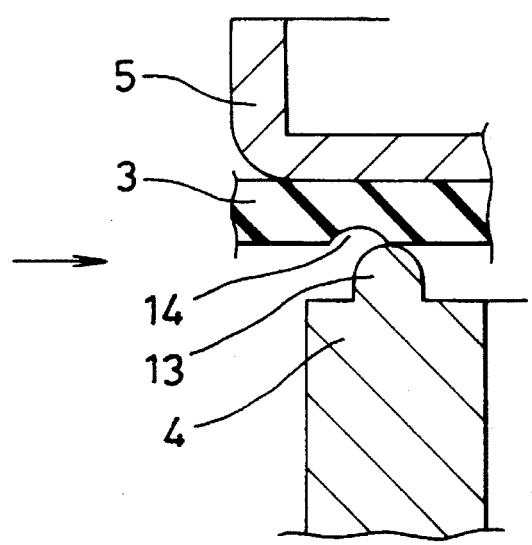
Figure 6:
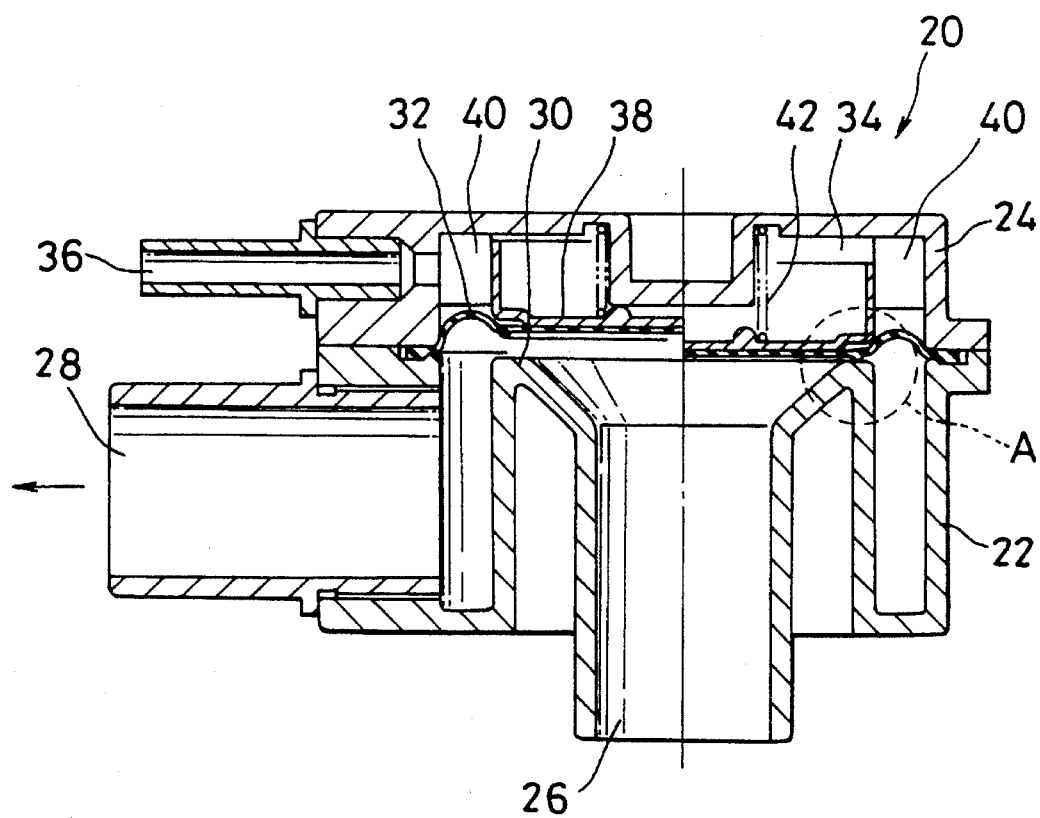
FIG. 6 is a cross-sectional view similar to FIG. 1 but showing the diaphragm valve according to the first embodiment of the invention.

Referring to FIGS. 6–9, the first embodiment of the invention will be described. As shown in FIG. 6, the diaphragm valve 20 may be comprised of a valve body 22 and a cap 24 which are fluid tightly joined with each other in the conventional manner. The body 22 has an inlet 26 and an outlet 28 which are adapted to be connected to flexible conduits, not shown. The body is provided with an annular valve seat 30 formed across a fluid passage between the inlet and the outlet.

The valve 20 further includes a diaphragm 32 made of an elastomer, the circumferential periphery of the diaphragm being fluid tightly sandwiched between the body 22 and the cap 24. The diaphragm 32 cooperates with the cap 24 to define a sensing chamber 34 in which a variable pressure is applied via a sensing port 36 as described later.

A spring retainer 38 made of metal or plastics is movably received in the sensing chamber 34 and is axially guided by a plurality of guide ribs 40 projecting radially inwardly of the cap 24. A compression coiled spring 42 is arranged between the cap 24 and the spring retainer 38 to bias the diaphragm 32 toward the valve seat 30.

Figure 7:
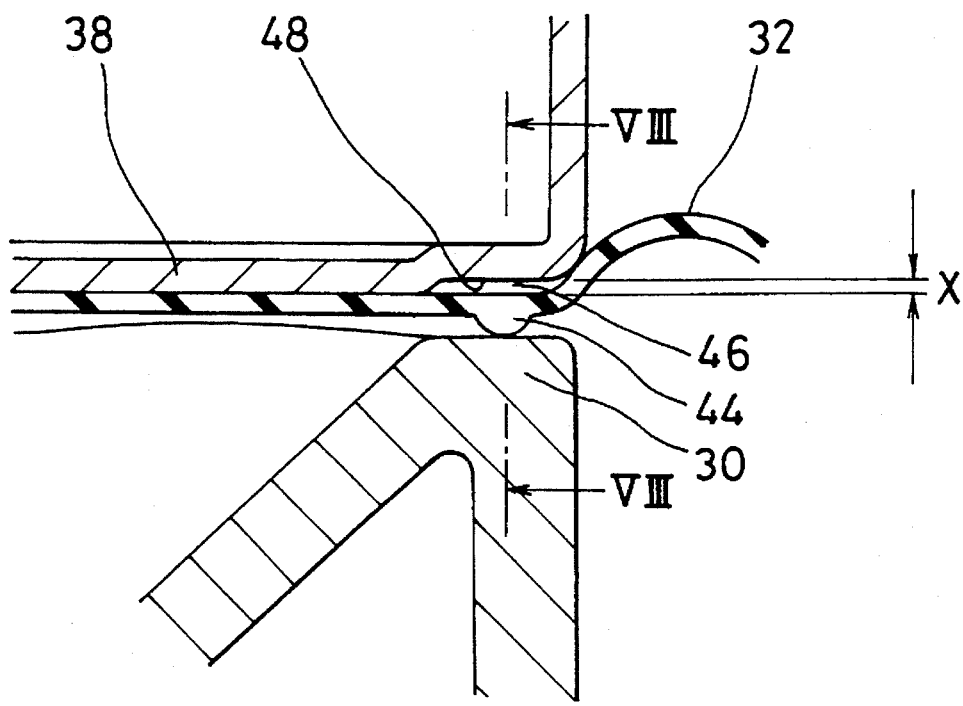
FIG. 7 is an enlarged cross-sectional view of a portion encircled by the circle A in FIG. 6 and taken along the line VII—VII of FIG. 8.

As shown enlarged in FIG. 7, the valve seat 30 is intended to present a flat surface perpendicular to the axis of the valve, in contrast to the diaphragm 32 being formed with an annular bead 44 facing the valve seat 30.

According to the invention, the portion of the spring retainer 38 facing the valve seat 30 is formed with an annular undercut or recess 46 as best shown in FIG. 7. Due to the provision of the undercut 46, the lower surface 48 of the portion of the retainer facing the valve seat is spaced, or relieved, for a distance X away from the upper surface of the diaphragm when the latter is in its free state.

While the diaphragm valve 20 of the invention may be used in a variety of situations wherein a fluid flow is controlled in response to a low pressure variation, a particularly suitable application is an automotive ORVR system as mentioned before. In such application, the inlet 26 of the valve 20 is connected to the top space of a fuel tank and the outlet 28 to a charcoal canister adapted to adsorb fuel vapor during refueling, with the sensing port 36 being connected to a filler tube of the fuel tank, as is well-known in the art. The coiled spring 42 is so adjusted that the valve is open when a pressure difference of about 20 mmAq is developed across the diaphragm 32.

When the fuel filler cap of the fuel tank is removed for refueling, the filler tube is subjected to the atmospheric pressure which, in turn, is reflected in the sensing chamber 34 of the diaphragm valve 20. As refueling is started, the inner pressure of the fuel tank will be raised which will be transmitted to the inlet 26 of the valve. When the pressure at the inlet 26 exceeds 20 mmAq (gauge pressure), the diaphragm 32 is lifted against the force of the spring 42 to permit the fuel vapor to flow to the canister for adsorption.

As refueling is terminated and the filler cap closed, both the inlet 26 and the sensing chamber 34 are subjected to an equal pressure so that the pressure differential across the diaphragm substantially disappears. Accordingly, the spring retainer 38 is moved under the action of the coiled spring 42 to urge the diaphragm against the valve seat 30 to close the valve.

Figure 9:
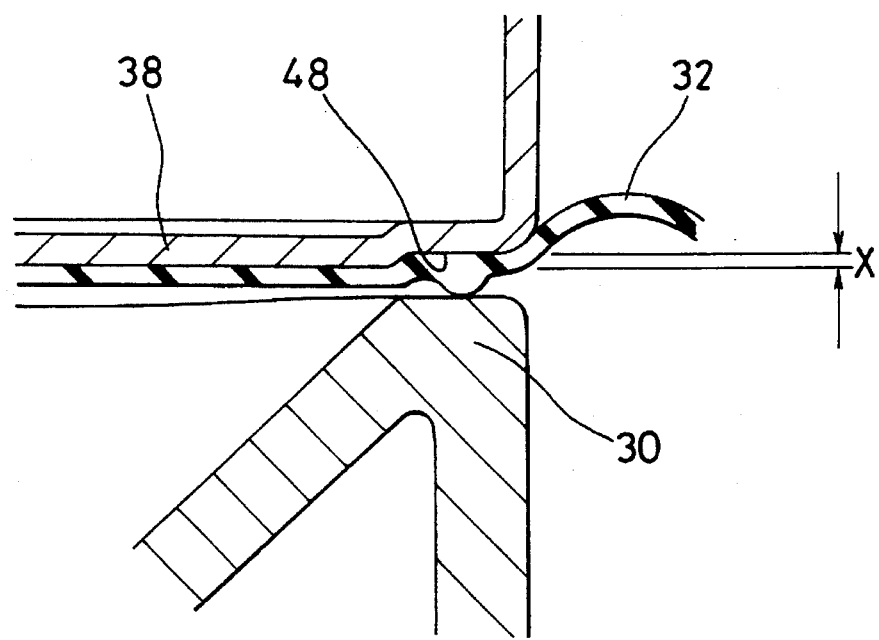
FIG. 9 is a cross-sectional view similar to FIG. 7 but taken along the line IX—IX of FIG. 8; and, FIGS. 10 and 11 are cross-sectional views of a part of the diaphragm valve according to another embodiment of the invention, and showing the valve in its open and closed positions, respectively.
Figure 8:
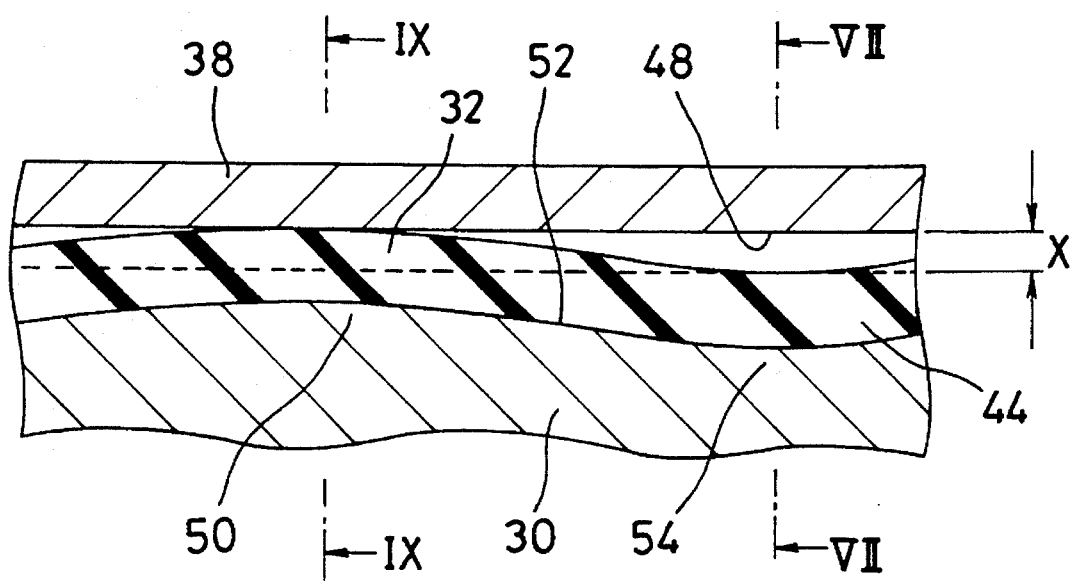
FIG. 8 is an enlarged cross-sectional view taken through a certain angle along a cylindrical plane indicated by the arrows VIII—VIII in FIG. 7.

Referring to FIGS. 7–9, as the spring retainer 38 moves on its closing stroke, the sealing bead 44 of the diaphragm will first be brought into engagement with the raised portion 50 of any circumferential undulation 52 that may be present on the valve seat 30. As the spring retainer strokes further, the portion of the sealing bead 44 that has engaged the raised portion 50 will yield upwards until it abuts against the relieved surface 48 as shown in FIGS. 8 and 9. In the depressed region 54 of the undulation 52, the sealing bead 44 in substantially the free state of the diaphragm engages the valve seat, as shown in FIGS. 7 and 8. In this way, in the fully closed position of the valve, the sealing bead 44 of the diaphragm will snugly engage the undulated valve seat 30 along the entire circumference thereof to completely shut-off the flow of fuel vapor.

Figure 10:
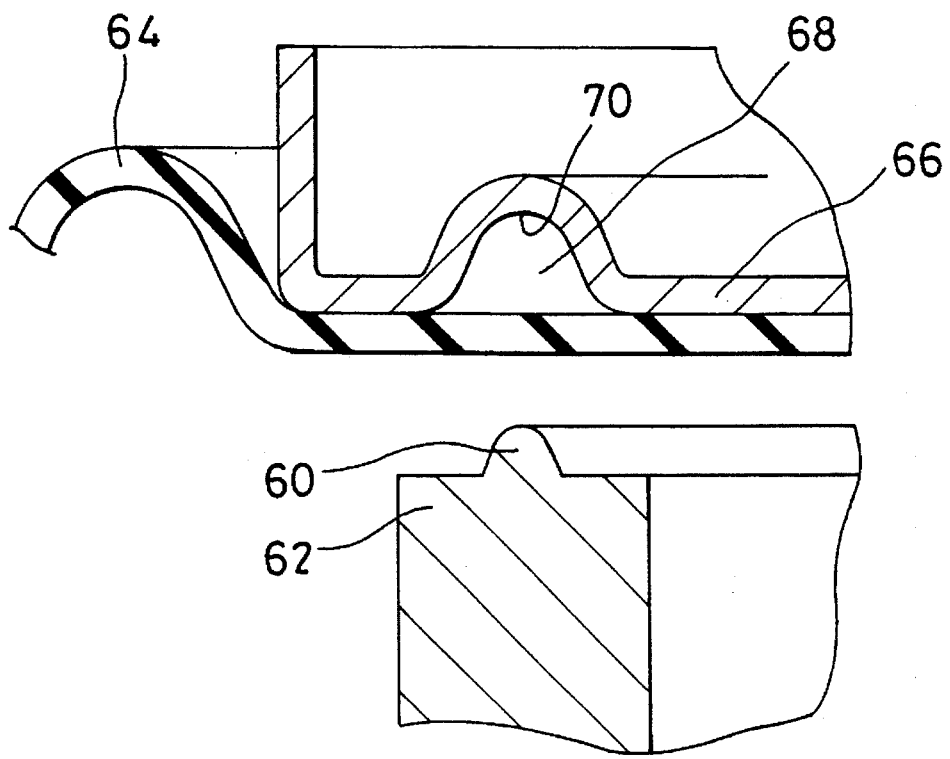
Figure 11:
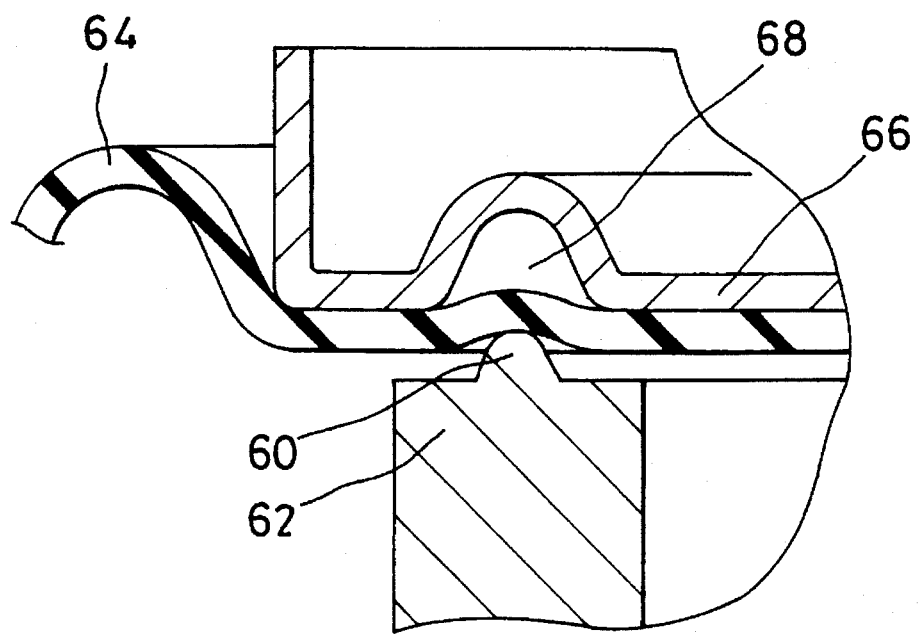

In FIGS. 10 and 11, there is shown the second embodiment of the invention. In these drawing figures, only a part of the diaphragm valve is shown. Other part of the valve is similar to that shown in FIG. 6 and, therefore, need not be described.

To describe only the differences, in the embodiment shown in FIGS. 10 and 11, an annular sealing bead 60 is formed on the valve seat 62. In contrast, the diaphragm 64 is free from a sealing bead and has a uniform thickness. The spring retainer 66 is provided with an annular groove 68 which is faced with the annular bead 60 of the valve seat and which serves to provide the relieved surface 70.

As the spring retainer 66 together with the diaphragm 64 moves from the position shown in FIG. 10 to the closed position shown in FIG. 11, the portion of the diaphragm engaging the annular bead 60 will resiliently yield into the groove 68 as shown. As a result, the diaphragm 64 is held in a proper sealing contact with the annular bead 60 throughout the entire circumference of the bead even though the annular bead 60 or the spring retainer 66 is undulated for some reasons.

This arrangement is also advantageous in that it is free from the foregoing problem resulting from swelling of the diaphragm. Even if the diaphragm expands in the radial direction due to swelling, the diaphragm 64 will be resiliently held constantly in contact with the sealing bead 60.

Another advantage is that, as the surface 70 is relieved away from the diaphragm, the sealing pressure acting on the diaphragm per unit circumferential length thereof is reduced. This is advantageous in avoiding the formation of a persistent deformation.

While the present invention has been described herein with reference to the specific embodiments thereof, it is contemplated that the invention is not limited thereby and various modifications and alterations may be made therein without departing from the scope of the invention. For example, the sensing chamber may be communicated with the atmosphere. The direction of the fluid flow through the valve may be reversed.

What we claim is:

1. In a diaphragm valve of the class in which an elastomeric diaphragm cooperating with an associated annular valve seat is backed-up by a rigid spring retainer biased by a coiled spring, the improvement wherein said spring retainer is provided at a portion thereof facing said valve seat with a relieved surface spaced away from said diaphragm in the free state thereof to permit an annular sealing portion of said diaphragm to resiliently yield in response to a circumferential undulation of said valve seat.

2. The improved diaphragm valve according to claim 1, wherein in the closed position of the valve said diaphragm is brought into contact with said valve seat throughout the entire circumference of said valve seat.

3. The improved diaphragm valve according to claim 1, wherein said diaphragm is responsive to a pressure variation in a sensing chamber defined by said diaphragm and wherein said spring has such a limited spring force that said diaphragm is operable to open the valve seat in response to a pressure drop in said sensing chamber of less than about 100 mmAq.

4. The improved diaphragm valve according to claim 3, wherein said spring has such a limited spring force that said diaphragm is operable to open the valve seat in response to a pressure drop in said sensing chamber of less than about 50 mmAq.

5. The improved diaphragm valve according to claim 1, wherein said valve seat has an annular bead engageable with said diaphragm and wherein said relieved surface is formed by an annular groove facing said annular bead.

* * * * *